No. 852,738. PATENTED MAY 7, 1907.
J. B. McKIEL.
TRUCK.
APPLICATION FILED OCT. 1, 1906.
3 SHEETS—SHEET 3.
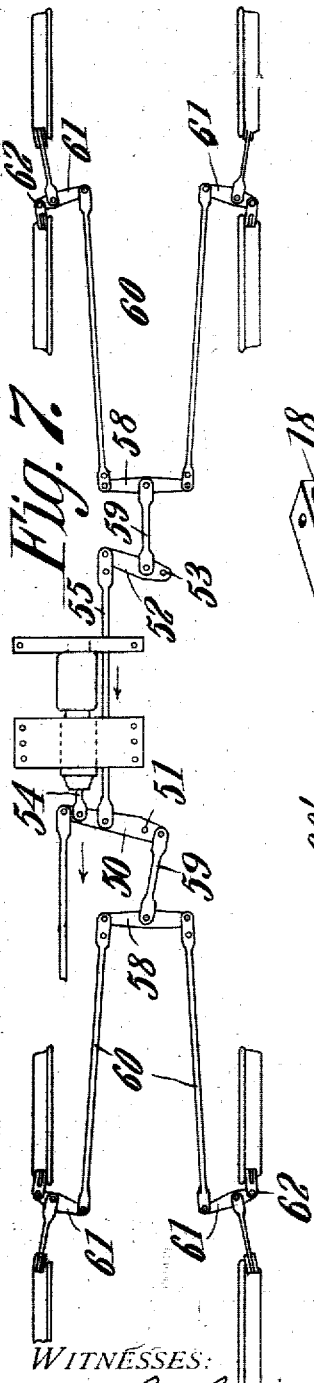
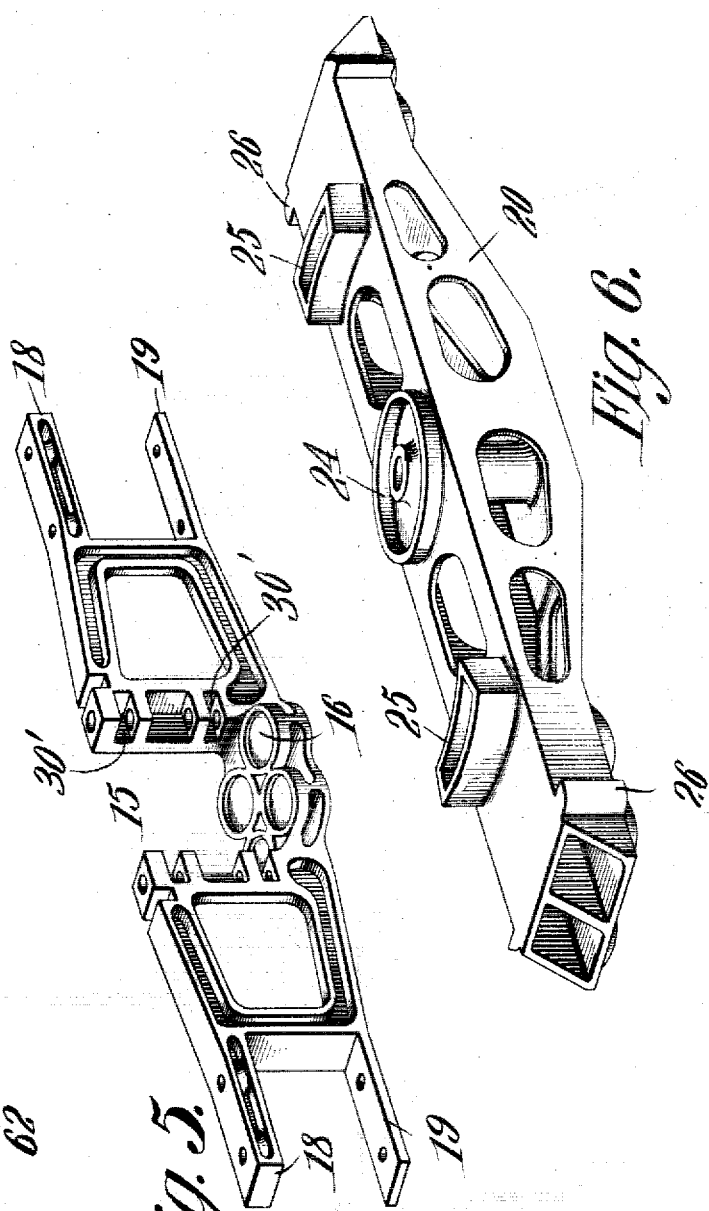
James B. McKiel,
INVENTOR
By 
ATTORNEYS
WITNESSES:

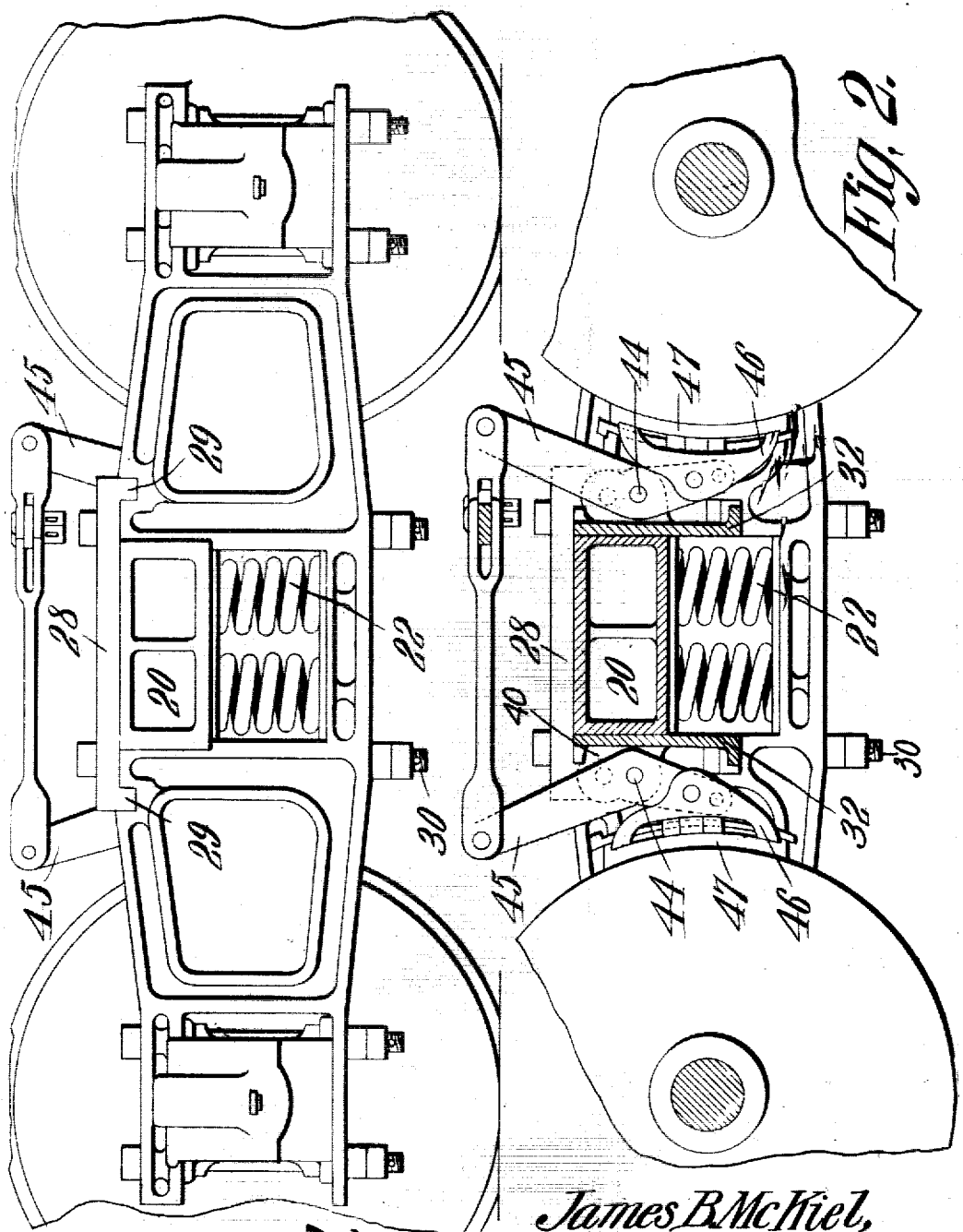

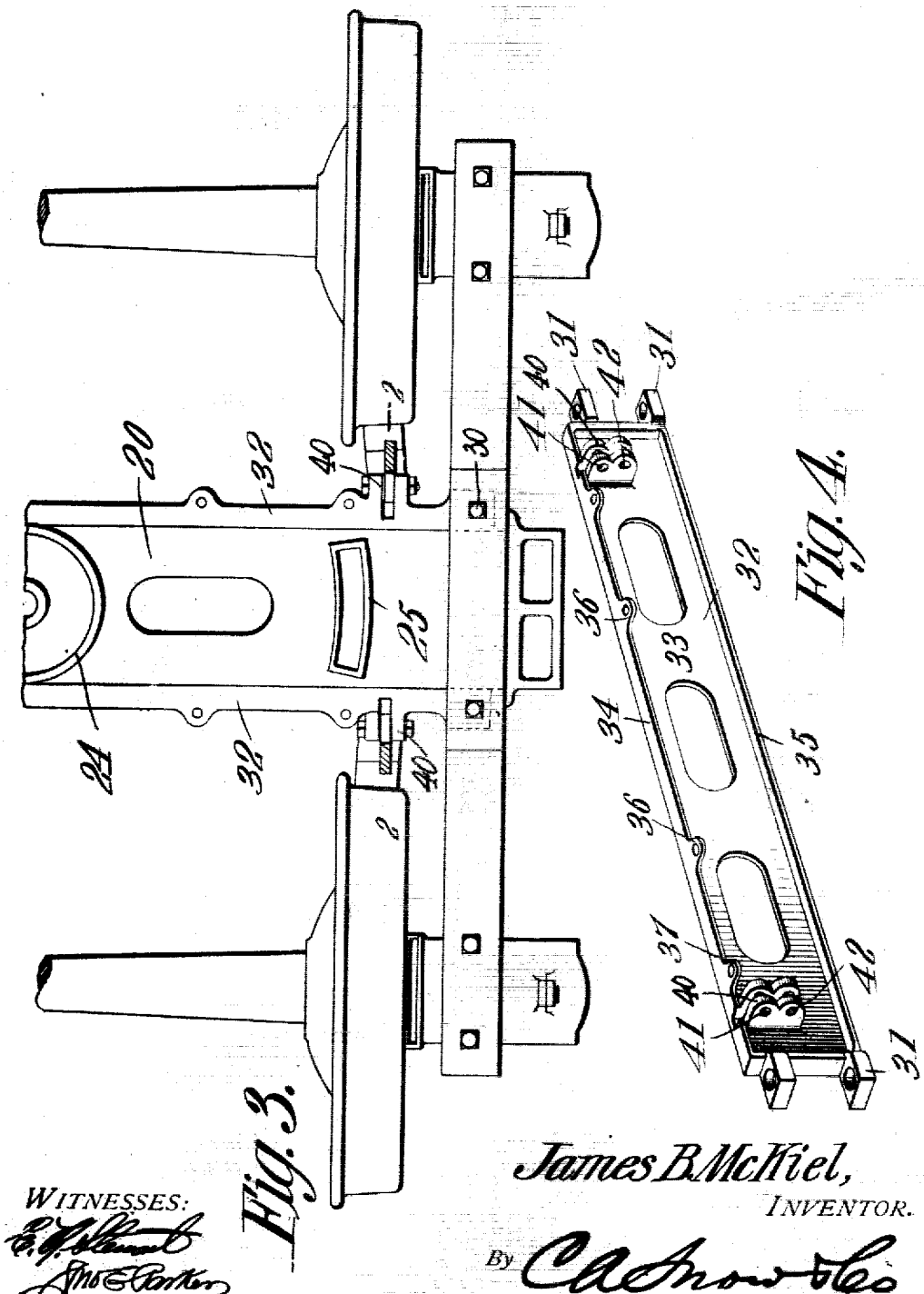

UNITED STATES PATENT OFFICE

JAMES B. McKIEL, OF MARSHALL, TEXAS.

TRUCK.

No. 852,738.　　Specification of Letters Patent.　　Patented May 7, 1907.

Application filed October .., 1906. Serial No. 336,89..

*To all whom it may concern:*

Be it known that I, JAMES B. MCKIEL, a citizen of the United States, residing at Marshall, in the county of Harrison and State of Texas, have invented a new and useful Truck, of which the following is a specification.

This invention relates to car trucks, and brake mechanism, and has for one of its objects to provide a light weight cast steel car truck which may be made at comparatively small expense, and in which parts can be replaced or repaired in case of accident at comparatively small cost.

A further object of the invention is to provide a truck so constructed as to equalize itself to accommodate imperfections of the wheels and track.

A still further object of the invention is to provide a cast steel truck of light weight in which the metal is so disposed as to obtain the utmost strength and rigidity.

A still further object of the invention is to provide a truck that is especially adapted for use in connection with beamless brake mechanism and is of such nature and construction as to permit the use of the ordinary brake mechanism where desired.

A still further object of the invention is to provide a truck with means for supporting the brake carrying levers of a beamless brake system, and further to so arrange the brake levers and rods as to secure uniform action of all of the brakes.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a side elevation of a truck constructed in accordance with the invention. Fig. 2 is a sectional elevation of the same on the line 2—2 of Fig. 3. Fig. 3 is a partly plan view of the truck, portions of the brake shoe carrying levers being shown in section. Fig. 4 is a detail perspective view of one of the transoms detached. Fig. 5 is a similar view of one of the side frames. Fig. 6 is a detail perspective view of the truck bolster. Fig. 7 is a plan view, partly in the nature of a diagram illustrating the arrangement of the brake levers.

Similar numerals of reference are employed to indicate corresponding parts throughout the several figures of the drawings.

The several parts of the truck are preferably formed of cast steel, and each of the side frames is constructed in the manner best shown in Fig. 5, this view showing the inner face of the side frame. The central portion of the frame is provided with a bolster receiving recess 15 at the lower portion of which is arranged spring pockets 16, four of which are shown in the present instance. The main body of the frame is generally of I beam shape in section, in order to secure the utmost strength with minimum weight. From the opposite ends of the main body of the frame extend arms 18 and 19 adapted for the reception of standard oil boxes.

Arranged in the recesses 15 and extending between the two side frames is a bolster 20 also formed of cast steel, and in the form of a hollow body having recessed or open bottom, top and side webs in order to reduce weight. The lower faces of the opposite end portions of the bolster are provided with spring receiving pockets, and between these and the pocket 16 extend standard springs 22, there being four of such springs at each end of the bolster. This bolster is provided at the center with the usual truck center plate 24, and near each end are the truck side bearings 25 all of these parts being made integral with the bolster casting. At the opposite ends of the bolster are laterally extended lugs 26 which fit against the outer walls of the side frames in order to limit endwise movement of the bolster, and the bolster is held down in place by tie plates 28 having downwardly extending lugs 29 at each end that fit within corresponding recesses formed in the side frames, the tie plates being held down in place by bolts 30 that extend through suitable lugs forme.. in the frames.

The lugs at the inner face of each frame are spaced as shown in Fig. 5 in order to form pockets 30' for the reception of lugs 31 that project from the opposite ends of the transoms 32, and all of these lugs are provided with openings for the passage of the bolts 30, so that a single set of bolts will serve to confine the bolster in place, and at the same time securely lock the transoms to the side frames, and if any of the parts become broken, the bolts may be readily removed and a new part or parts substituted.

Each of the transoms is provided with a vertically disposed web 33 and upper and lower webs or ribs 34—35, respectively, and the upper ribs are provided with projecting lugs 36 and 37, so that, if necessary, the ordinary brake mechanism may be attached to the truck. The lugs 36 serve for connection with the brake lever stops of outside brakes, while the lugs 37 may be employed for attaching the several hangers of inside brakes of the beam type.

Near each end of each of the transoms is arranged a pair of spaced lugs 40, each pair of lugs being provided with upper and lower openings 41 and 42, the upper openings serving when necessary for the attachment of the inside hung brake beams of the ordinary type. The lower openings serve for the passage of pivot pins 44 which carry the levers 45 of a beamless brake which forms one of the features of the invention. Each of the levers 45 carries at its lower end a brake shoe head 46 to which may be attached a brake shoe 47 of any ordinary construction.

In arranging the braking system, provision is made for exercising a direct pull on all of the brake lever connecting rods, so that there shall be no thrust strain. For this purpose the primary lever 50 is pivoted at 51 to a part of the car frame and the secondary lever 52 is pivoted at 53 to the car frame. The piston rod 54 of the brake cylinder exercises a direct outward thrust on the lever 50 and this pulls the connecting rod 55 in the direction indicated by the arrow in Fig. 7. This movement is transmitted to a cross bar 58 by a connecting rod 59, and from the cross bar is transmitted through a pair of rods 60 to the lever 61 which latter is connected to the two brake shoe carrying levers by connections 62. The same construction is followed at the opposite end of the car.

A truck constructed in accordance with this invention has but few parts, and these may be readily made at small cost, and in case of accident a broken part may be readily replaced. The truck is further so constructed as to permit of the application thereto of the beamless brake described, or the old style inside or outside brakes if preferred, without change in the structure.

I claim:—

1. In a car truck, a pair of side frames having centrally arranged recesses, a truck bolster having its ends extending into said recesses, transoms extending between the side frames, the transoms and side frames being provided with interfitting lugs, and bolts extending through said frames.

2. In a truck, a pair of side frames having centrally arranged recesses and provided on their inner faces with lug receiving pockets, a pair of transoms extending between the side frames and having lugs extending into said pockets, a bolster disposed between the transoms and having its end portions fitting within the recesses, tie plates for limiting upward movement of the bolsters, and bolts extending through the tie plates and lugs and serving to secure the transoms to the side frames.

3. The combination in a truck, of side frames having centrally arranged recesses provided with spring receiving pockets, the inner faces of the frames having spaced lug receiving pockets, a pair of transoms having end lugs fitting within the pockets, a truck bolster fitting within the transoms and having its ends arranged within the recesses, the lower face of the bolster having spring pockets, springs for supporting the bolster, tie plates extending over the tops of the recesses and limiting upward movement of the bolster, the opposite ends of the tie plates being provided with downwardly extending lugs fitting in corresponding recesses in the side frames, and securing bolts extending through the tie plates and the transom lugs.

4. A built up truck comprising side frames, a pair of transoms extending between the side frames, a single vertical bolt forming the connection between each end of each transom and the side frames, and a truck bolster arranged between the transoms, said bolster having laterally projecting lugs at or near its outer ends.

5. A built up truck comprising a pair of side frames having central recesses and provided with arms projecting from both ends for the reception of journal boxes, a pair of transoms extending between the side frames and bolted thereto, a truck bolster having its ends arranged within the recesses and provided with lugs that bear against the outer faces of the side frames, tie plates crossing the recesses and limiting upward movement of the bolster, and supporting springs for said bolster.

In testimony that I claim the foregoing as my own, I have hereto affixed my signature in the presence of two witnesses.

JAS. B. McKIEL.

Witnesses:
 A. M. WINN,
 B. L. LANGLEY.